Aug. 31, 1965

C. L. SIEGLAFF ETAL 3,203,225

CAPILLARY EXTRUSION RHEOMETER

Filed April 22, 1963

INVENTORS
CHARLES L. SIEGLAFF
JAMES M. McKELVEY

BY C T Cross

ATTORNEY

Aug. 31, 1965  C. L. SIEGLAFF ETAL  3,203,225
CAPILLARY EXTRUSION RHEOMETER
Filed April 22, 1963  5 Sheets-Sheet 5

INVENTORS
CHARLES L. SIEGLAFF
JAMES M. McKELVEY
BY C. T. Cross
ATTORNEY

United States Patent Office 3,203,225
Patented Aug. 31, 1965

3,203,225
CAPILLARY EXTRUSION RHEOMETER
Charles L. Sieglaff, Mentor, Ohio, and James M. McKelvey, St. Louis, Mo., assignors to Diamond Alkali Company, Cleveland, Ohio, a corporation of Delaware
Filed Apr. 22, 1963, Ser. No. 274,673
7 Claims. (Cl. 73—15.4)

This invention relates to a new and improved apparatus for determining the rheological properties of matter. More particularly, the invention relates to a novel extrusion capillary rheometer having special utility in the study of melt flow behavior of thermally unstable polymers.

Rheology, the study of the deformation of matter, is of prime importance in the development and commercial use of many polymeric substances. In general, rheological properties are determined by measuring the flow properties of, for example, a polymer, under applied pressure, typically by extruding it through a capillary tube.

The present invention is concerned with a new and improved instrument adapted to determine the rheological properties of liquids and plastic materials at temperatures at which viscous deformation is predominant, i.e., in the melt state. Instruments presently used to study the rheology of polymeric substances generally embody features which in some instances are undesirable, e.g., slow operation, limited accuracy of temperature measurement; a requirement for a large sample; necessity for keeping the material to be tested at an elevated temperature for an extended period; a stepwise control of applied stress and, in many instances, substantial lack of reproducibility.

To determine adequately the rheological properties of a substance requires that the test instrument must be capable of subjecting the material to be tested to accurately controlled and determined temperature and stress. Moreover, these factors must also be variable over a wide range of values.

Former methods of applying stress to the material under study in order to force it through a capillary, typically consisted of manually applying metal weights to a platform supported by the material. The flow rate was determined by weighing the material extruded over a known period of time. This method was time-consuming and subject to errors.

Attempts to improve the means for applying stress to materials in instruments of this type resulted in an apparatus which, instead of determining a flow rate directly, applied a mechanical force at a constant rate and, from values obtained by the determination of resulting extrusion pressures, the flow rate was calculated from the obtained data. This attempt to improve the art of rheological study resulted in a relatively inflexible system whereby, in order to provide accuracy, only a limited number of flow rate determinations could be made on any given material.

In order to minimize inherent errors of such devices, fairly large samples of the material to be tested were required. This requirement produced no handicap in the testing of ordinary materials. However, in many instances, large samples are not available. Moreover, thermally unstable polymers are especially difficult to test by means of an extrusion capillary rheometer because of the time required to heat the sample to a uniform temperature throughout its mass. Since prior devices required the material to be tested to be retained at elevated temperatures, the danger of decomposing the material before the test could be completed was increased.

It is, therefore, a principal object of this invention to provide an improved extrusion capillary rheometer having accuracy and versatility heretofore unobtainable.

Another object of this invention is to provide an extrusion capillary rheometer especially adapted for use in the determination of melt flow properties of thermally unstable material.

Still another object of this invention is to provide an extrusion capillary rheometer which reduces the labor required to determine the melt flow properties of plastic materials.

A further object of this invention is to provide an extrusion capillary rheometer which decreases the time required for measurements of the melt flow properties of plastic materials and plots shear stress and flow rate simultaneously on a recorder.

These and other objects of this invention will become apparent from the following description and drawings.

The apparatus of this invention, capable of accurately determining and recording the rheological properties of materials which undergo viscous deformation, comprises, in combination, a heater or electric furnace containing a removale barrel which, in turn, contains an open cylinder having therein a capillary opening, a pneumatically operated plunger or piston reciprocally movable in the cylinder and removable therefrom and electronically operated means capable of determining the force applied to the plunger and means of determining velocity of its movement in the cylinder. The flow rate and applied force are recorded simultaneously on a two-channel high-speed recorder. Thus, an operator can determine a full flow curve with one loading of the barrel by a stepwise increase of the pressure on the pneumatic cylinder without the stopping and reading pressure dials or timing flow rates.

The extrusion capillary rheometer of the present invention presents many advantages over known rheometers, for instance, data is obtained which is directly interpretable at conditions comparable to actual use, i.e., at shear rates corresponding to use conditions; reproducibility and accuracy are improved due to smoothing of small errors by a curve rather than a single point; processability of materials having very high viscosities as well as very low can be measured by changing capillary dimensions and the processability of such materials can be interrelated; in case of polymer decomposition, the replacement of the barrel and capillary is a simple and relatively inexpensive operation and the flow data is obtained as a permanent record allowing calculations to be checked and postponed to a convenient time.

The force required to extrude the material to be studied is provided by a high pressure gas supply, which can be regulated to provide a constant pressure by a contant output pressure regulator valve and further governed by a double-action cylinder. The variety of pressures obtainable is limited only by the sensitivity of the regulator valve. The piston shaft of the cylinder, hereinafter called the drive shaft, is in series communication with an electronic pressure measuring device and a plunger. Aligned with the plunger is a cylindrical opening, typically 3 inches long and 0.3 inch in diameter, wherein the material to be studied is placed and from which it is extruded by the use of the plunger. Also in communication with the piston shaft is an electronic velocity determining device capable of measuring the linear velocity of the shaft. The velocity of the shaft equals the rate at which the material being studied is extruded through the capillary member of the apparatus.

The open cylinder containing the capillary opening is located in the center of a barrel which is encased in and machined to match the contour of the heater, preferably an electric furnace of high heat capacity. The upper end of the barrel extends above the furnace and is threaded to receive a retainer nut. The lower end of the barrel is threaded to receive a fitting containing a capillary. The capillary fitting may be machined to receive, interchangeably, capillary tubes, through which the material placed in the open cylinder may be extruded.

The furnace, containing the barrel, capillary fitting and capillary tube, is rigidly supported, as by on legs or other means, at a height which will allow a collection vessel to be placed below the capillary.

The rate at which the material is extruded from the capillary is determined by an electronic velocity determining device, preferably a velocity transducer. Such a device is incorporated into the apparatus of this invention by means of a non-magnetic rod attached at one end to the drive shaft of the piston. The other end of the rod is attached to the movable magnetic core of the transducer. The motion of the drive shaft thus is transmitted by the rod to the magnetic core of the velocity transducer, thereby generating voltage in the transducer which is recorded by an electronic recorder calibrated to yield volumetric flow rates of extrusion.

The extrusion rate of the polymer melt at a known temperature and pressure may be determined by the apparatus of this invention without the use of a velocity transducer if a preweighed receiver for the extrudate is placed under the capillary opening to collect the extrudate. The rate of flow is calculated by weighing an extrudate of timed duration and dividing the weight by the density.

The pressure applied to the plunger during the operation of the apparatus is accurately determined and recorded electronically. In the preferred embodiment of this invention, a device, commonly termed a "load cell," is employed, located between the piston drive shaft of the amplifying cylinder and the plunger. The sensitive element of the cell is a high-strength metal column, to which are bonded resistance wire strain gages. These gages are electrically connected to form a balanced Wheatstone bridge. A constant voltage is applied across opposite corners of the bridge so that a change in force on the cell, thus changing the resistance of the gages, will produce a corresponding change in the output voltage. This change in output voltage is measured and preferably is reported via suitable calibration directly in units of force or weight.

In order more fully to understand the scope and operation of the apparatus of this invention, reference is now made to the accompanying drawings wherein FIGURE 1 is a side elevational view of one form of the apparatus of the present invention;

Figure 1:
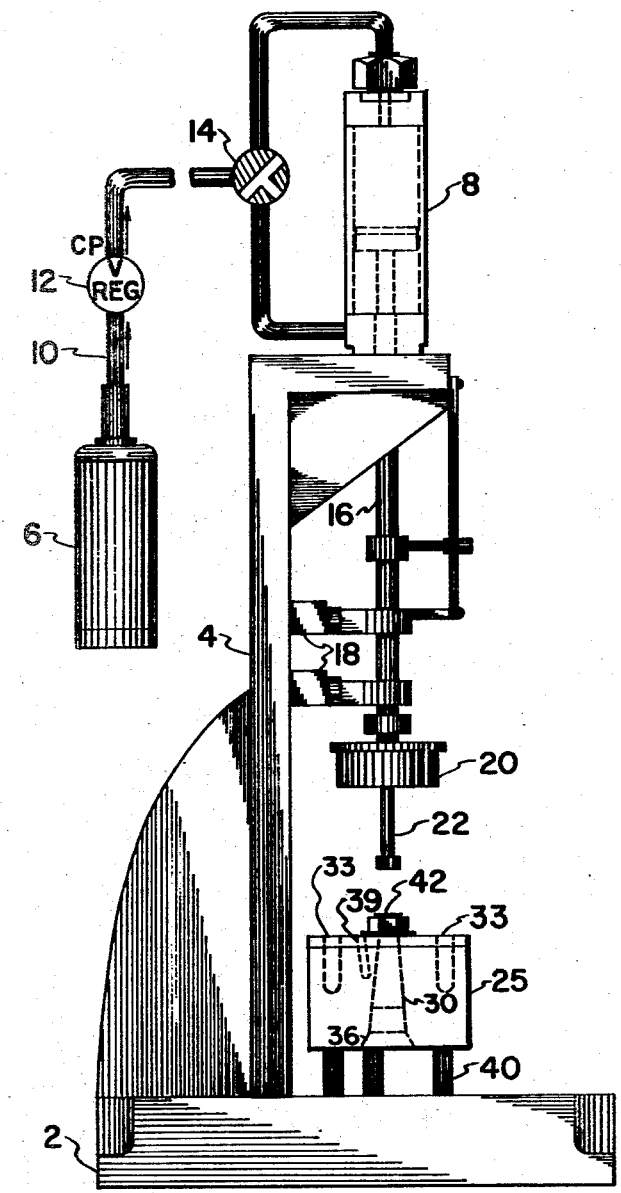
Figure 2:
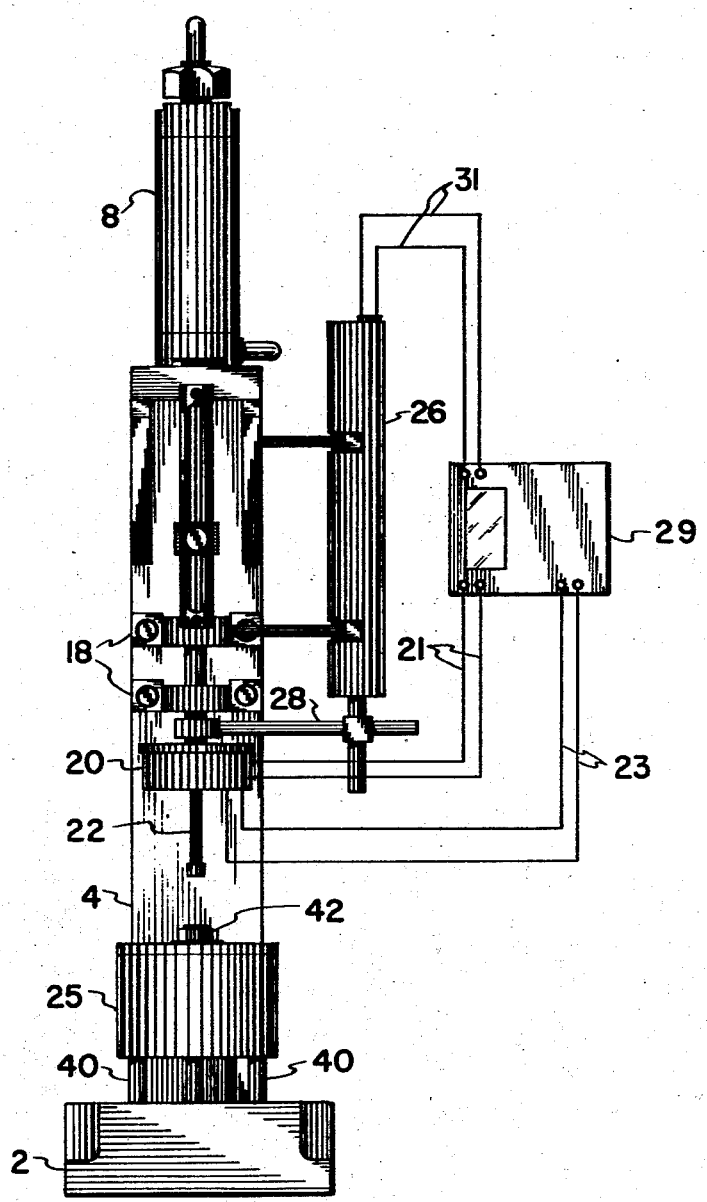
FIGURE 2 is a front elevational view of the apparatus of FIGURE 1.

Referring more particularly to FIGURES 1, 2, 3 and 4, the apparatus of the present invention is supported on a base 2 and vertical support 4. The power by which a sample material is extruded is supplied by a compressed gas in storage container 6. The gas is delivered to an amplifying cylinder 8 through conduit 10 which contains pressure regulator 12 and valve 14. The piston drive shaft 16 of the amplifying cylinder, guided by bearings 18, communicates the force of the gas pressure to the electronic pressure measuring device 20 and is connected thereto by means of a threaded fitting. The pressure measuring device is connected to an electronic recorder 29 by wires 21. A 6 to 10-volt voltage input to the pressure sensing device is carried from a voltage amplifier (not shown) within electronic recorder 29 by wires 23. Connected to the underside of the pressure measuring device 20 is depending plunger 22. In a preferred embodiment of this invention, the plunger 22 is loosely connected to the pressure measuring device in order to provide sufficient movement for self alignment with an open cylinder 24 located directly below the plunger and residing in furnace 25.

The velocity of the pitson of the amplifying cylinder 8 is measured by a velocity transducer 26. The piston drive shaft and transducer are interconnected by means of a non-magnetic rod 28. After initial compression of the material to be tested the velocity of extrusion is identical to the velocity of the piston and it is recorded by recorder 29 through wire 31.

The velocity transducer 26 (Sanborn LVsyn Transducers, Sanborn Co., Waltham, Mass.) is composed of two members. A shielded, hollow coil surrounds a movable magnet. A small electric current is generated in the transducer by the motion of the magnet through the open center of the coil. The electric current, thus generated, is amplified and measured by a recorder 29, which is calibrated in units of linear velocity.

In the operation of the apparatus, a substance to be tested is placed in open cylinder 24, located in barrel 30, and allowed to attain the temperature predetermined by the control of the electric furnace 25 by cartridge heaters 33. The plunger, actuated by gas pressure, moves into the open cylinder and forces the material through capillary 34 residing in capillary fitting 36.

The capillary fitting is threaded into the barrel with no discontinuity in the internal base of the cylinder or the external taper of the barrel. Well 38 is also drilled in the capillary fitting so that a temperature sensing element such as a thermocouple may be inserted at a point near the center of the capillary length. Accurate extrusion temperature determinations are obtained by the apparatus of this invention by placing the thermocouple into the capillary fitting itself, rather than into the furnace member of the device as was done in the devices formerly used. A temperature sensing element is placed in hole 39 in the furnace for temperature control.

The assembly comprising the furnace, barrel and capillary fitting is supported on legs 40 to provide sufficient space beneath the capillary to accommodate a collecting vessel for the extrudate.

Figure 3:
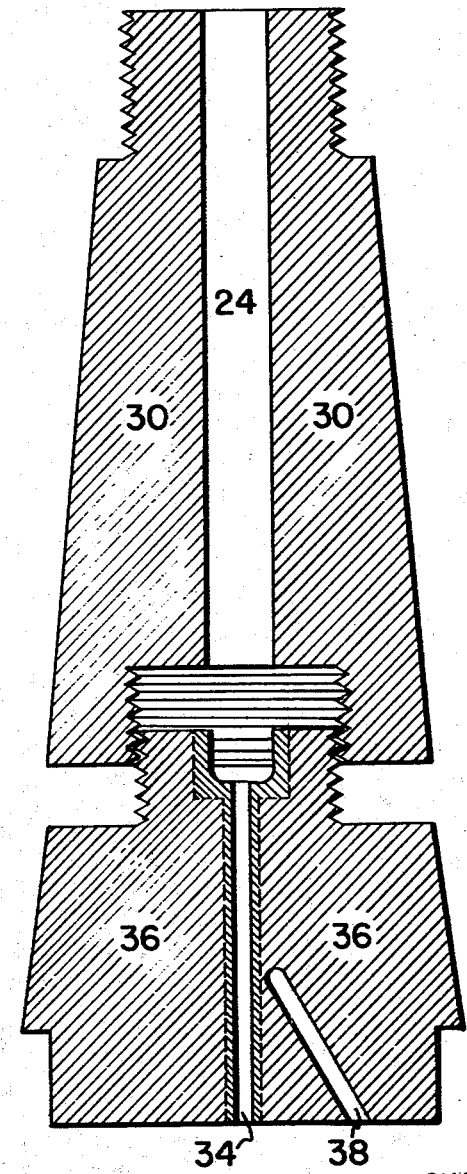
FIGURE 3 is a detailed sectional view of the barrel and capillary members of the apparatus of FIGURE 1.
Figure 4:
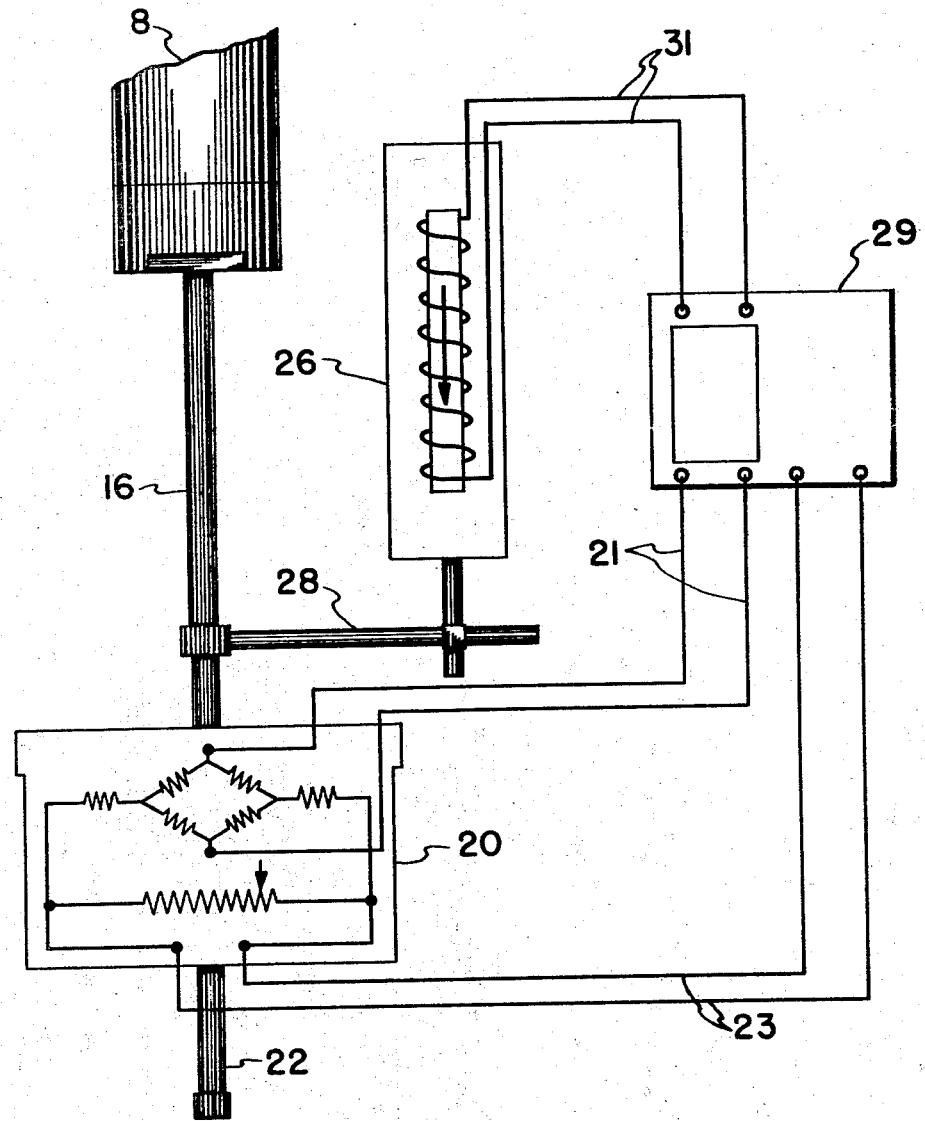
FIGURE 4 is a schematic wiring diagram of the electronic pressure sensing measuring device and electronic velocity determining device in combination with a two-channel high-speed recorder.

FIGURE 3 displays the preferred tapered design of the barrel and capillary members of the apparatus. The tapered design enables the furnace and barrel members of the device to be drawn together providing metal-to-metal contact; thereby aiding heat transfer efficiency. The tapered design also renders the barrel easily removable for cleaning purposes. The barrel is seated into the furnace and retained there by means of retainer nut 42.

The capillary opening may be incorporated into the device in either of two ways. The capillary fitting may be machined to receive interchangeable capillaries as indicated by the dotted lines in FIGURE 3 or the capillary opening may be drilled directly into the capillary fitting itself. The apparatus remains equally versatile because of the removable capillary fitting The design of the capillary fitting permits the positioning of a thermocouple closer than previously possible to the capillary opening; thereby providing more accurate and meaningful data.

In the preferred embodiment of this invention, the plunger is driven by a 150 p.s.i., 2½-inch diameter gas cylinder. Using this driving mechanism, it is possible to conveniently obtain an infinitely variable force of 1,000 lbs. on the material to be tested through manipulation of regulator valve. The force is measured by a compression load cell (LeBow Associates, Oak Park, Michigan) and communicated to a fast-response recorder (Ultralinear Oscillograph, Brush Instrument Company, Cleveland, Ohio). This system is capable of measuring to within plus or minus 1% the pressure applied to the material being tested. The piston rod is preferably a ¼-inch steel rod with a "Teflon" tip screwed onto the end. The upper end of the piston is attached pendulantly to the underside of the load cell to provide motion for self alignment.

Figure 5:
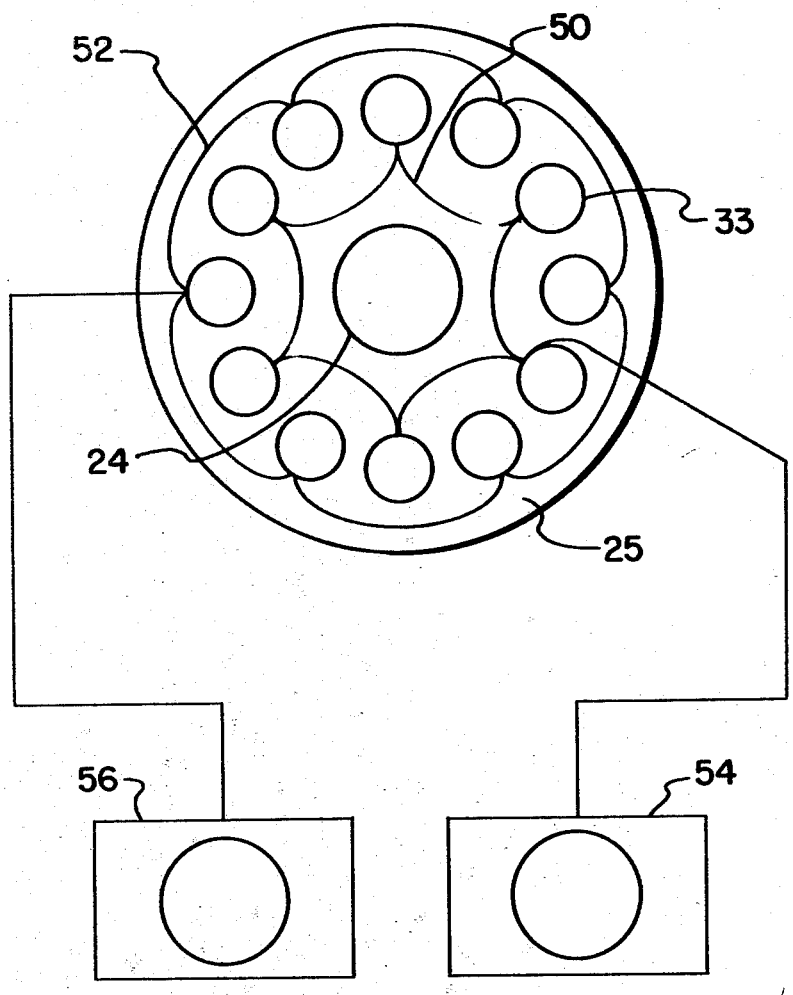
FIGURE 5 is a detailed top view of the furnace and heating cartridges.

The barrel and capillary fitting preferably are heated by a furnace controlled to plus or minus 0.5° C. In the preferred embodiment, as displayed by FIGURE 5, the furnace is constructed from a 6-inch diameter by 6-inch block of steel. The heating is provided by twelve ⅜-inch diameter cartridge heaters 33, arranged in a circle concentric with the tapered hole 24. Six of the heaters are manually adjusted to provide a furnace temperature approximately 10° C. less than the desired control temperature. The other six heaters are controlled by a proportional controller (Assembly Products, Inc., Chesterland, Ohio) to maintain the desired temperature. The manually adjusted heaters and proportional controlled heaters are preferably alternately placed in the concentric circle and each group of heaters is interconnected by lead wires 50 and 52, respectively, which in turn are adjusted by control mechanism 54 and 56, respectively.

A large mass of metal is employed to house the heating elements, thus providing a large reservoir of heat around a comparatively small cylinder located in the barrel. In the preferred embodiment, the 6-inch diameter furnace holds within itself a barrel containing a cylinder of 0.260 inch in diameter and 3 inches long. The small diameter of the cylinder used to receive the polymer contributes to the fast heating of the sample. The diameter of the cylinder is maintained at a minimum because plastic materials are notably poor heat conductors and therefor difficult to heat throughout their mass in a short time.

Although the specific, preferred embodiment of this invention is described as including an amplifying cylinder of 2½-inch diameter, it is further provided that the apparatus is capable of adapting interchangeable amplifying cylinders of various diameters. The combination of interchangeable capillary openings and amplifying cylinders provides an apparatus capable of determining (with equal ease and accuracy) the flow rate of materials characterized by viscosities from values of 0.1 poise to 1,000,000 poises at operating temperatures. It is to be understood that materials whose viscosities are such that they are capable of flowing through the capillary opening of the present apparatus at room temperature do not need to be heated by the furnace member in order to render them in a flowable state. The shear rate range which may be covered by the rheometer of the present invention may be from about one $sec^{-1}$ to about 10,000 $sec^{-1}$ and the shear stress may range from about $10^3$ to $10^7$ dynes/sq. cm.

That, although the invention has been described with specific reference to particular embodiments thereof, it is not to be so limited, since changes and alterations therein may be made which are within the full intended scope of this invention as defined by the appended claims.

What is claimed:
1. An extrusion capillary rheometer comprising a furnace containing a removable barrel; said barrel containing an open cylinder and means for removably affixing a capillary fitting concentric with said cylinder; said capillary fitting having a capillary opening concentric with said cylinder and provided with means for positioning a temperature sensing element in close proximity to at least a portion of said capillary opening; a piston reciprocally movable within said cylinder and capable of being completely removed therefrom for ease in inserting a thermoplastic material within said cylinder; a power source attached through a drive shaft and an electronic pressure sensing element to said piston at its driven end; said pressure sensing element being instantaneously responsive to the force exerted by said source in forcing said thermoplastic material through the capillary opening; an electronic velocity sensing element affixed to said drive shaft and instantaneously responsive to the velocity at which the drive shaft moves the piston forcing the thermoplastic material through the capillary opening; and a source of electrical energy interconnected with said pressure sensing element and said velocity sensing element; said sensing elements being responsive to rapid minute changes in pressure and velocity, respectively.

2. An extrusion capillary rheometer as in claim 1, wherein the barrel is tapered.

3. An extrusion capillary rheometer as in claim 1, wherein the barrel and capillary fitting are tapered.

4. An extrusion capillary rheometer as in claim 1, wherein the electronic velocity sensing element is a velocity transducer.

5. The apparatus of claim 4 wherein the velocity transducer is a linear velocity transducer.

6. The apparatus of claim 1 wherein the furnace contains heating elements arranged in a circle concentric with the open cylinder.

7. The apparatus of claim 1 wherein means are provided for recording flow rate and applied force simultaneously in response to signals from the electronic velocity sensing element and pressure sensing element.

References Cited by the Examiner

UNITED STATES PATENTS

| | | | |
|---|---|---|---|
| 2,031,018 | 2/36 | Thomas | 73—56 X |
| 2,045,548 | 6/36 | Dillon et al. | 73—15.4 X |
| 2,764,889 | 10/56 | Hughes et al. | 73—15.4 |
| 2,876,637 | 3/59 | Kurylko et al. | 73—56 |
| 2,979,768 | 4/61 | Nichols | 18—12 |
| 3,037,371 | 6/62 | Black | 73—15.4 |
| 3,053,081 | 9/62 | Raschig et al. | 73—56 X |
| 3,090,075 | 5/63 | Provenzano et al. | 18—12 |

RICHARD C. QUEISSER, *Primary Examiner.*